L. SKEELS.
Tinners' Shears.
No. 16,290. Patented Dec. 23, 1856.
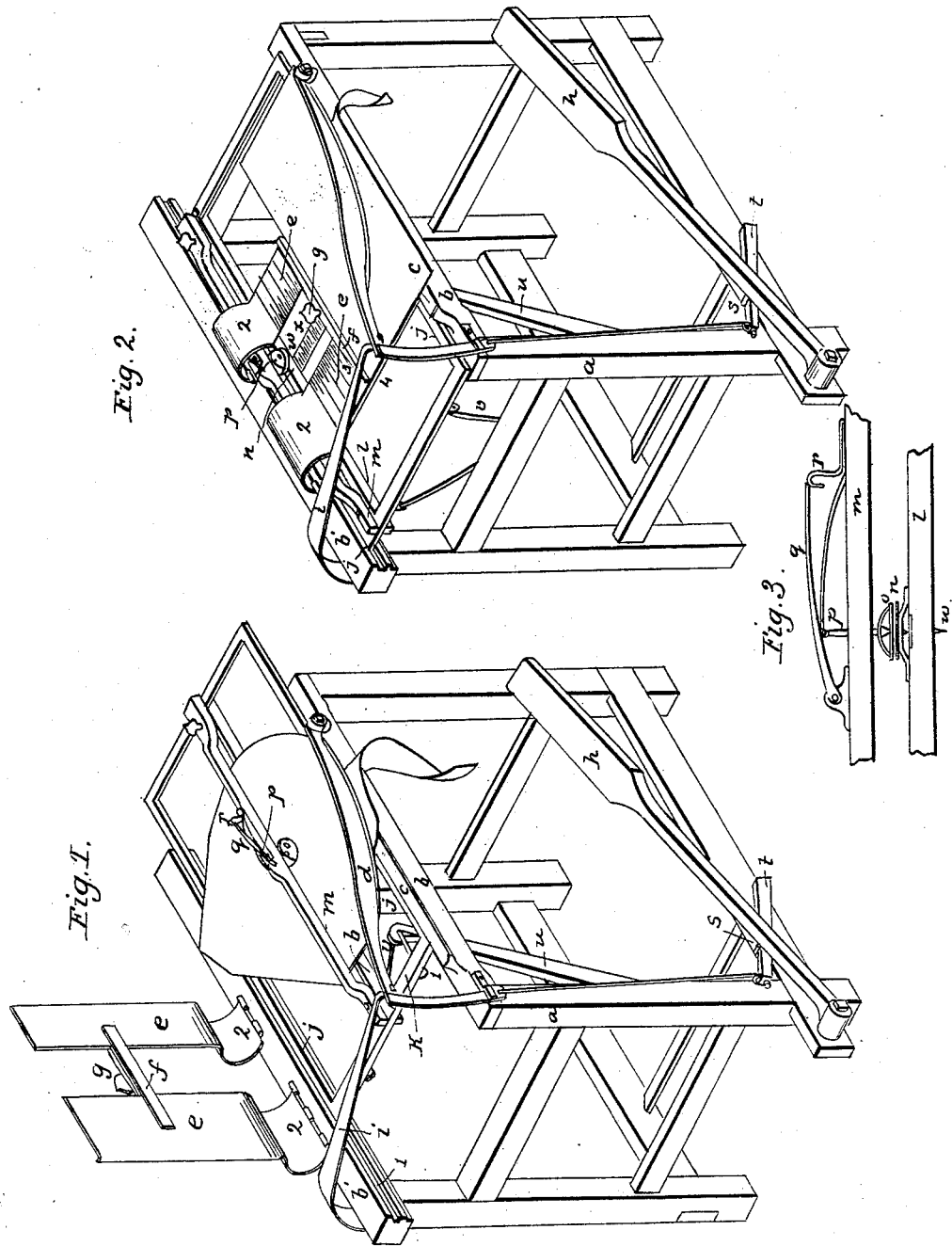

UNITED STATES PATENT OFFICE.

LEVI SKEELS, OF OSTRANDER, OHIO.

TINNER'S SHEARS.

Specification of Letters Patent No. 16,290, dated December 23, 1856.

*To all whom it may concern:*

Be it known that I, LEVI SKEELS, of Ostrander, Delaware county, Ohio, have invented a new and useful Improvement in Tinners' Shears; and I do hereby declare the following to be a full, clear, and exact description thereof, reference being had to the annexed drawings, making part of this specification.
The chief object of my invention is to supersede the costly machines now specially employed for cutting all circles too large to stamp, by employing a combination of devices which enable the same shears to be used for cutting either circles or straight edges.

In the accompanying drawings Figure 1 is a perspective view of my machine as employed for cutting circles. Fig. 2 is a perspective view of the machine as employed for straight work. Fig. 3 is a side view (on a larger scale) of the rotating and sliding clamp and its accessories.

($a$, $b$, $b'$) is the supporting frame of which the two upper rails ($b$ $b'$) are grooved (1) on their inner sides, to support and guide a carriage hereafter more particularly described. The rail ($b$,) is armed on its upper outer edge with a sharpened blade ($c$) forming the lower jaw or member of a pair of shears of the kind technically known as "straight shears" and has hinged to its front near one end, a flat or plane blade ($d$) having the usual curved cutting edge, which blade constitutes the upper member of the said shears. This blade ($d$) is actuated by means of a treadle ($h$) and retracted by a spring ($i$) of usual form. I will first describe the use of these shears in the getting out of straight work. Hinged to the rear rail ($b'$) is a bench ($e$) consisting of two plates or slabs as represented, level at front, but arched upward (2) immediately in front of the hinge, in order to allow room for a portion of the circle cutting mechanism. This bench is at one end provided with a flange (4) to serve as a side stop or gage for the tin.

($f$,) is an adjustable bar attached to the bench ($e$,) by means of a suitable clamp screw ($g$,) and serving as a gage or stop for the edge of the tin opposite that which is being trimmed or cut, thus enabling the stock to be worked with facility to any desired dimensions and angles. The bench ($e$) may also be graduated or marked with a scale (3) for the accurate adjustment of the bar ($f$.)

When it is desired to employ the machine for getting out round work, the bench ($e$,) is thrown back as represented in Fig. 1 and the following devices are employed.

($j$, $k$,) is a carriage composed of a rectangular frame-work of rails of which the side rails ($j$,) play longitudinally in the grooves (1) in the main frame. Formed so as to grasp the end rails ($k$,) of the carriage and capable of being shifted nearer to or farther from the shears is a pair of bars ($l$,) ($m$,). These bars are separated a short distance from each other so as to admit between them a pair of disks ($n$) ($o$) presented toward and parallel to each other and of which one ($n$,) is attached to the upper side of the under bar and the other one ($o$) to a rod ($p$,) which passing upward through the upper bar is connected to a lever ($q$,) whose end being caught in the latch ($r$) the upper disk is thereby firmly pressed down upon the lower disk or upon a sheet of tin previously laid thereon. When this portion of the apparatus is employed the actuating treadle ($h$,) is connected with the carriage by means of arms and levers ($s$) ($t$) ($u$) ($v$) in such a way that the advance of the clamping disks keeps exact pace with the point of intersection of the shears; so that the outer edge of the tin being held fast by the shears, the clamp in the act of traveling forward causes the piece of tin to rotate like a wheel resulting in the separation of a very perfect circle whose radius is exactly equal to the distance between the clamp and the shears. A pin ($w$,) depending from the center of the lower disk indicates the precise position of the center of rotation of the clamp and beneath this point a graduated bar ($x$) may be stretched athwart the frame and thus enable the easy adjustment of the apparatus to cut a circle of any required size.

A practical test involving the almost constant use of this machine in my own workshop ever since its first construction some months since, establishes its non-liability to get out of order or cut a "turned edge," to which in unskillful hands the usual costly revolving disk-cutter machine is subject.

I do not desire to confine myself to the precise arrangement contained in the present illustration but propose to make such modifications as experience may suggest.

I claim herein as new and of my invention:

1. The rotary and sliding clamp (*n, o, p, q, r*) in the described combination with the straight shears (*c, d,*) for the cutting of circular forms as herein explained.

2. The described arrangement and combination of the hinged bench (*e, f, g,* 2, 4,) with the fixed bench or frame (*b b'*) and with the shears (*c, d,*) for the purposes set forth.

In testimony of which invention I hereunto set my hand.

LEVI SKEELS.

Attest:
JAS. H. GRIDLEY,
GEO. H. KNIGHT.